April 5, 1932.  L. CLOUD  1,852,954

TRACTOR WHEEL

Filed Aug. 11, 1930

LOEL CLOUD
INVENTOR

BY Victor J. Evans
ATTORNEY

WITNESS:
J. Meyer

Patented Apr. 5, 1932

1,852,954

UNITED STATES PATENT OFFICE

LOEL CLOUD, OF RUSHVILLE, INDIANA

TRACTOR WHEEL

Application filed August 11, 1930. Serial No. 474,533.

This invention relates to tractor wheels in general and particularly to the kind adapted to be useful in connection with work in sticky or wet earth, and especially in field work. Where the ground is sandy, soft or wet, the ordinary type of tractor wheels have the tendency to pack the ground especially between what is known as traction flights, which packing makes the wheels practically useless after a period of working time.

The primary object of my invention, therefore, is to provide a tractor wheel which will eliminate the disadvantages found in present day tractor wheels and particularly prevent "packing".

Another object of my invention is to so construct my tractor wheel that whatever soft earth or dirt contacts with the wheel, is moved sidewise and out of the wheel, thereby automatically cleaning the traction surface of the latter.

Other objects and advantages of the invention will be hereinafter specifically pointed out or will become apparent as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In the drawings.

Similar reference characters refer to similar parts throughout the several views of the drawings.

Figure 1:
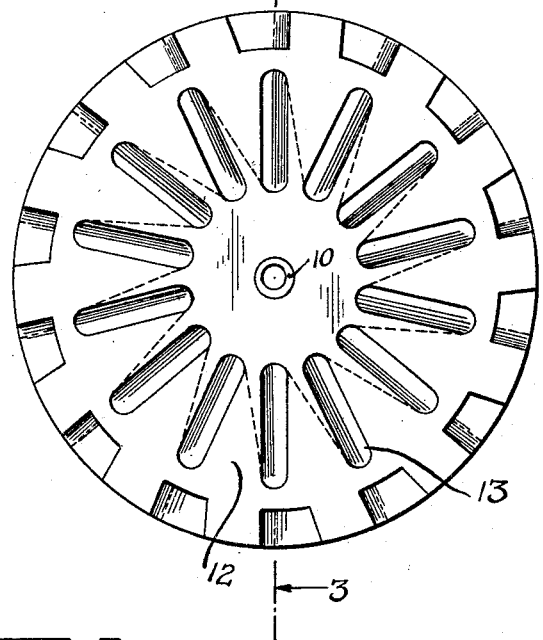
Fig. 1 is a side elevation of my tractor wheel illustrating the outer wheel side.
Figure 2:
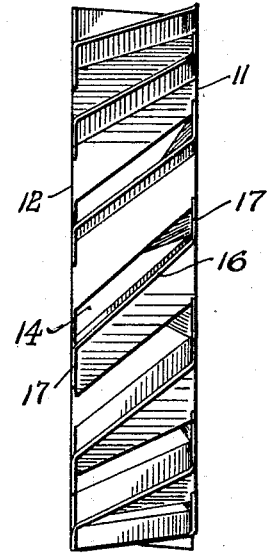
Fig. 2 is an end elevation thereof.
Figure 3:
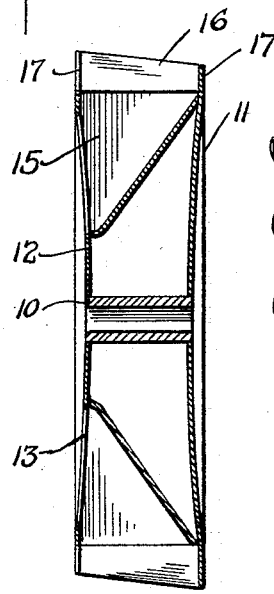
Fig. 3 is a cross sectional view taken on line 3—3 of Fig. 1.
Figure 4:
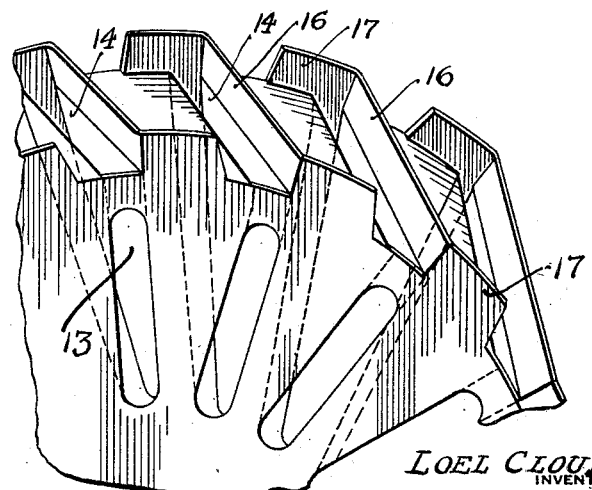
Fig. 4 is an enlarged perspective detail view of a portion of my wheel.

Referring now more in detail to the embodiment of my tractor wheel, numeral 10 denotes a hub to which is attached at one of its ends a disc 11, while at the other end another disc 12 is secured. Disc 12 is clearly seen from Fig. 1 and is provided with a plurality of radial slots 13 extending from practically the outer periphery of the disc towards but not quite to the hub portion of the disc.

Connecting the two side discs with each other there is provided a peripheral rim equipped with diagonally disposed transverse slots indicated at 14. These slots 14 communicate with slots 13 of the outer wheel disc by means of pockets or chutes indicated at 15, the number of slots in the outer disc corresponding with the number of slots provided in the rim and the mentioned chutes extending in the direction of the rim slots 14 so that the dirt will be extruded forwardly and laterally.

Extending from the rim outwards, there will be observed traction means 16 in the form of flights, the form of which is essentially Z-shaped. The flights are disposed with their longest portions adjacent to one side of slots 14 provided in the rim, while the ends of the flights are extended peripherally alongside the edges of the two wheel discs as clearly seen at 17 in the drawings. These extensions 17 are substantially in the plane of the wheel discs.

*Operation.*—The function of my tractor wheel is vastly different from that of tractor wheels used heretofore in that the dirt is not pressed against the rim of the wheel, but forced into slots 14 and thereby through chutes 15 outwards and on to the side of the wheel. In this manner a tractor equipped with my tractor wheels may move continuously without losing traction and with a minimum or practically no accumulation of dirt upon the surface of the tractor wheel.

It is obvious that in providing a tractor with my wheels, the non-slotted disc portion of the wheel faces the tractor itself while the slotted disc is facing outwards. Such application prevents piling up of dirt under the tractor or against the tractor machinery which would be inevitable if the discharge of chutes 15 were directed inwards.

Attention is called to the arrangement of slots 14 and flights 16 relative to the wheel itself. It is essential that the transverse portions of flights 16 and their adjacent slots 14 are directed outwards so that the earth or mud, engaged by the flights may pass unrestrictedly through the chutes upwards and be discharged in forward direction. If the arrangement of flights 16 and slots 14 would be reversed the mud or earth would be forced directly against the rear walls of the chutes and would have to travel rearwards before discharging. This would cause binding and would require greater force for discharging the earth, resulting in clogging of chutes.

It is essential, therefore that left and right-hand tractor wheels are employed and that their flights and slots are disposed in diagonally outward and forward directions.

The hereinabove described construction admits of considerable modification without departing from the invention; therefore, it is my wish not to be limited to the precise arrangements shown and described, which are as aforesaid, by way of illustration merely. In other words, the scope of protection contemplated is to be taken solely from the appended claim, interpreted as broadly as is consistent with the prior art.

What is claimed is:

In a traction wheel, a hub, a pair of spaced side disks, one disc being secured to the inner end of the hub and the other disc being secured to the outer end of the hub, said last mentioned disc being provided with radial slots, a rim connecting the peripheries of said disks and provided with diagonally forwardly extending transverse slots corresponding in number to the number of the first mentioned slots, chutes corresponding in direction with the rim slots and connecting the rim slots with the disc slots for the purpose of extruding dirt forwardly and laterally, and a plurality of traction flights at the outer periphery of the rim adjacent the rim slots, each flight having circumferentially extending end portions, the number of flights equalling the number of said rim slots.

In testimony whereof I hereby affix my signature.

LOEL CLOUD.